April 27, 1926.
A. KEOGH
THERMOMETER BACK
Filed March 23, 1922
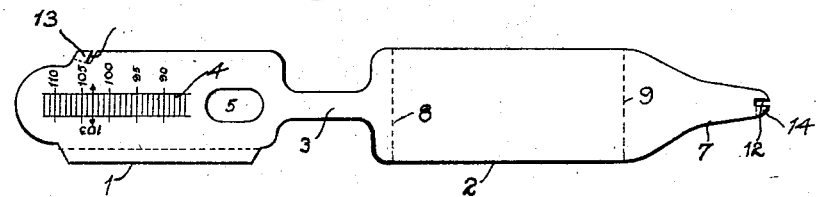
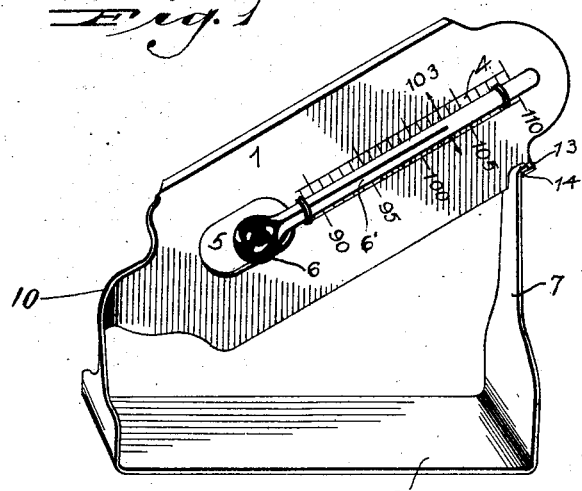
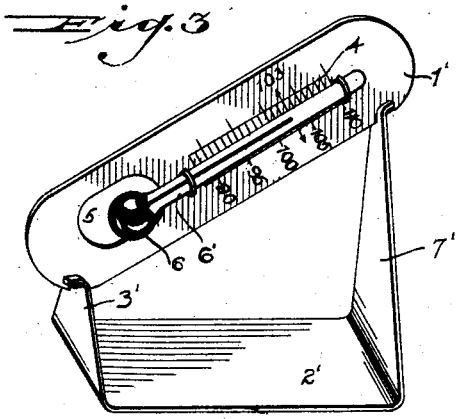
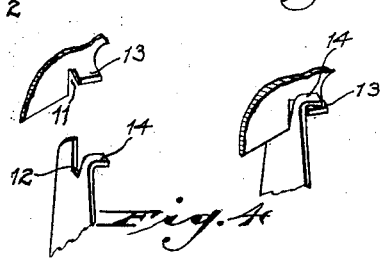

Patented Apr. 27, 1926.

1,582,871

UNITED STATES PATENT OFFICE.

ANTHONY KEOGH, OF SPRINGFIELD, OHIO, ASSIGNOR TO THE CHANEY MANUFACTURING COMPANY, OF SPRINGFIELD, OHIO, A CORPORATION OF OHIO.

THERMOMETER BACK.

Application filed March 23, 1922. Serial No. 545,988.

*To all whom it may concern:*

Be it known that I, ANTHONY KEOGH, a citizen of the United States, residing at Springfield, in the county of Clark and State of Ohio, have invented certain new and useful Improvements in Thermometer Backs, of which the following is a specification.

This invention relates to thermometers and more particularly to a self supporting thermometer back and stand.

The thermometer mounting forming the subject matter hereof is particularly adapted for incubator thermometers but may be employed for other purposes, wherever it may be desirable to have a thermometer to stand on a supporting base. The successful operation of an incubator is dependent to a very great extent upon maintenance of uniform predetermined temperatures. In order to secure uniformity, it is not only necessary that the thermometer should be placed within the egg tray of the incubator, but that it should be maintained at a predetermined level or in certain relation with the eggs, contained within the tray. Moreover, for convenience, the thermometer should be capable of being read from the front of the tray without displacement of the eggs.

The object of the invention is to simplify the structure as well as the means and mode of operation of thermometer stands or supports, whereby they will not only be cheapened in construction, but will be more efficient in use, capable of supporting the thermometer in a predetermined standardized relation with the eggs within an incubator, and in a position to be conveniently and easily read through the glass front of the incubator tray.

A further object of the invention is to provide a stand or support capable of being easily and cheaply produced from a single piece of sheet metal, cut to a particular shape or blank, bent and twisted upon itself, to produce the support or stand.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, wherein is shown, the preferred, but obviously not necessarily the only form of embodiment of the invention, Fig. 1 is a perspective view of the assembled thermometer stand with a thermometer in place thereon. Fig. 2 is a plan view of the blank, from which the stand or support is formed. Fig. 3 is a perspective view of a modification of the construction shown in Figs. 1 and 2. Figs. 4 and 5 are detail views illustrating the manner of interlocking the support or standard and the thermometer back or pallet.

Like parts are indicated by similar characters of reference throughout the several views.

The thermometer stand or support forming the subject matter hereof, may be formed in various manners, from different materials. For instance a wooden base having legs or supports attached thereto for carrying the thermometer back may be employed. The preferred mode of constructing the support or stand, is to form it from a single sheet metal blank bent and twisted upon itself, as is shown in Fig. 1. This sheet metal blank comprises initially two sections or pallets, 1 and 2, interconnected one with the other by an intermediate narrow strip or neck portion 3. The section or pallet 1, in the finished product comprises the thermometer back to which the tube is attached. To this end, this section or pallet 1 is provided with graduations 4, representing degrees of temperature. At one end thereof is provided a hole or depression 5 in the pallet or section 1, to accommodate the bulb 6 of a thermometer tube 6', which is subsequently applied to this back section. The second section or pallet 2, in the finished product comprises the base or foot upon which the structure rests. It is formed with a reduced extension 7, which when bent upwardly to a position substantially perpendicular to the plane of the pallet or section 2 forms one of the uprights or supporting struts, for the thermometer back 1. The blank is bent at right angles upon the dotted lines 8 and 9 of Fig. 2, thereby erecting the strut or standard 7 at one end of the base section or pallet 2, and erecting the neck portion 3 also to a substantially upright or perpendicular relation at the opposite end of the base section or pallet. This neck portion is medially twisted as at 10 in Fig. 1, to bring the thermometer back section 1 into a plane perpendicular to the plane of the base or foot section 2. The point of flexure and degree and formation of such bend determines the relative height of the back section above the base. The thermometer back or tube carrying section 1, while occupying a vertical plane is inclined upwardly or diagonally in such plane and is engaged with the upturned extremity of the standard or upright 7. The upright 7 being of much greater length than the neck portion 3 when bent perpendicular to the base supports the back section 1, in this diagonal inclined relation. The back section 1 and the supporting strut 7 may be interlocked by any suitable mode of engagement as by soldering, brazing, welding or otherwise. However, in the present instance, a cheap and economical mode of attachment has been shown consisting of interlocking slots 11 and 12 formed in the back section 1 and standard 7 respectively. Each of the members is thrust within the slot of the other members so that the slotted or bifurcated portion of each member straddles the opposing member. The adjacent ears or corners 13 and 14 of the back section and standard, respectively, are bent laterally one over the other, to prevent the disengagement or withdrawal of the engaged member as is shown in Figs. 1 and 5.

While in Figs. 1 and 2 the support has been shown formed from a single piece of material, wherein the back pallet 1 and base portion 2 are integrally united, it is to be understood that the invention is not limited to this construction alone, but that the various parts may be formed separately and interengaged or united one with the other as is found most convenient and economical.

In Fig. 3, the back section or pallet 1' has been shown independent of the base section 2', the latter being provided with integral uprights or standards 3' and 7'. These standards or uprights are both interlocked with the back or tube supporting section 1' by the same type of interlocking joint, shown in Figs. 4 and 5. In order to stiffen and strengthen the thermometer back pallet, the latter is flanged by bending one edge 13 thereof rearwardly. This will stiffen the tube supporting section and prevent any flexing which might break the thermometer tube.

The construction thus produced while capable of supporting a thermometer for any purpose is particularly applicable to incubators, in that it will occupy but little space, yet will support the tube above the level of the eggs in the tray, but in close proximity thereto. Furthermore, the base portion 2 being quite thin, as well as the standards 7, it will not interfere with the spacing of the eggs within the tray. The support will conveniently hold the thermometer in a position for standard comparison reading. That is to say, inasmuch as certain standard temperatures have been established, for incubating purposes, the use of a support such as described will enable the thermometer readings to be standardized and temperatures uniformly maintained, inasmuch as the thermometer in each incubator will be at the same relative level and occupying the same relation to the eggs. The supporting parts being quite thin the stand may be introduced among the eggs without occupying appreciable space, since the base or standard portions may be overlapped by the eggs.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. As an article of manufacture, a self supporting thermometer comprising a base having its opposite ends upturned to form integral standards of different height and a thermometer back carried by the standards in an inclined position over said base.

2. As an article of manufacture, a thermometer back and a supporting base therefor, formed from a single piece of sheet material, an intermediate connecting portion integral with the back and base, for supporting the back in spaced relation above the base, the intermediate connecting portion being flexible and capable of being bent to different formation to vary the relation of the back and base.

3. In an incubator thermometer, a broad flat base, adapted to rest upon the bottom of an egg tray and beneath adjacent eggs located on the tray affording a self supporting rest with its opposite ends upturned to form spaced integral standards, a panel carried by such integral spaced standards and positioned immediately above said base and lying in a plane substantially perpendicular to the base, and a thermometer tube supported upon said panel in inclined relation with its bulb approximately on level with the tops of the eggs.

4. As an article of manufacture, a thermometer back and a substantially U-shaped support comprising a horizontal base and upstanding spaced standards of different lengths on which the thermometer back is supported in a longitudinally inclined position.

5. As an article of manufacture a self supporting thermometer including two panels of sheet material interconnected by an elongated intermediate neck portion, the neck portion being twisted to present the panels in planes at right angles one to the other but spaced one from the other and a terminal extension upon one of the panels, engageable with the other panel to maintain their spaced relation, said last mentioned panel serving as a support and back for a thermometer tube and the other as a supporting base.

6. In an incubator thermometer or the like, a broad flat base portion, a panel located vertically above and in a plane substantially perpendicular to the base portion, a thermometer tube carried thereby, a flexible neck portion integrally connecting one end of the panel and one end of the base and adapted to be variously curved to enable a limited range of vertical adjustment of the panel and base by which the height of the thermometer bulb above such base may be varied, the opposite end of the panel being supported in elevated position upon the upturned extremity of the base, the whole forming a self supporting structure resting in balanced relation on said base.

7. As an article of manufacture, a thermometer frame stamped from a single piece of sheet metal and comprising a base portion having its opposite ends upturned to form standards and a thermometer back supported on said standards.

8. In an incubator thermometer or the like, a base portion, integral standards located at opposite ends of the base portion, a panel portion carried thereby and adjustable to various elevated relations above the base portion and a thermometer tube carried by the panel, the space intermediate the standards and between the panel and base being open for the free circulation of air therethrough.

9. In a thermometer of the class described, a thermometer back panel and a base portion, a flexible elongated neck connecting the back panel and base portion said intermediate neck portion being twisted through a substantially quarter turn in relation with the base and back panel whereby the back panel is presented in a plane substantially perpendicular to the base portion but in spaced relation thereabove a distance substantially equivalent to the height of an egg, and a thermometer tube carried by the back panel.

10. As an article of manufacture, a thermometer frame constructed of a single piece of sheet material and comprising a thermometer back and a base, the back and base being connected by an intermediate strip bent upward from the base to form a standard for the back, with the opposite end of the base portion upturned to form a second standard for supporting the thermometer back.

In testimony whereof, I have hereunto set my hand this 14th day of March A. D. 1922.

ANTHONY KEOGH.